UNITED STATES PATENT OFFICE.

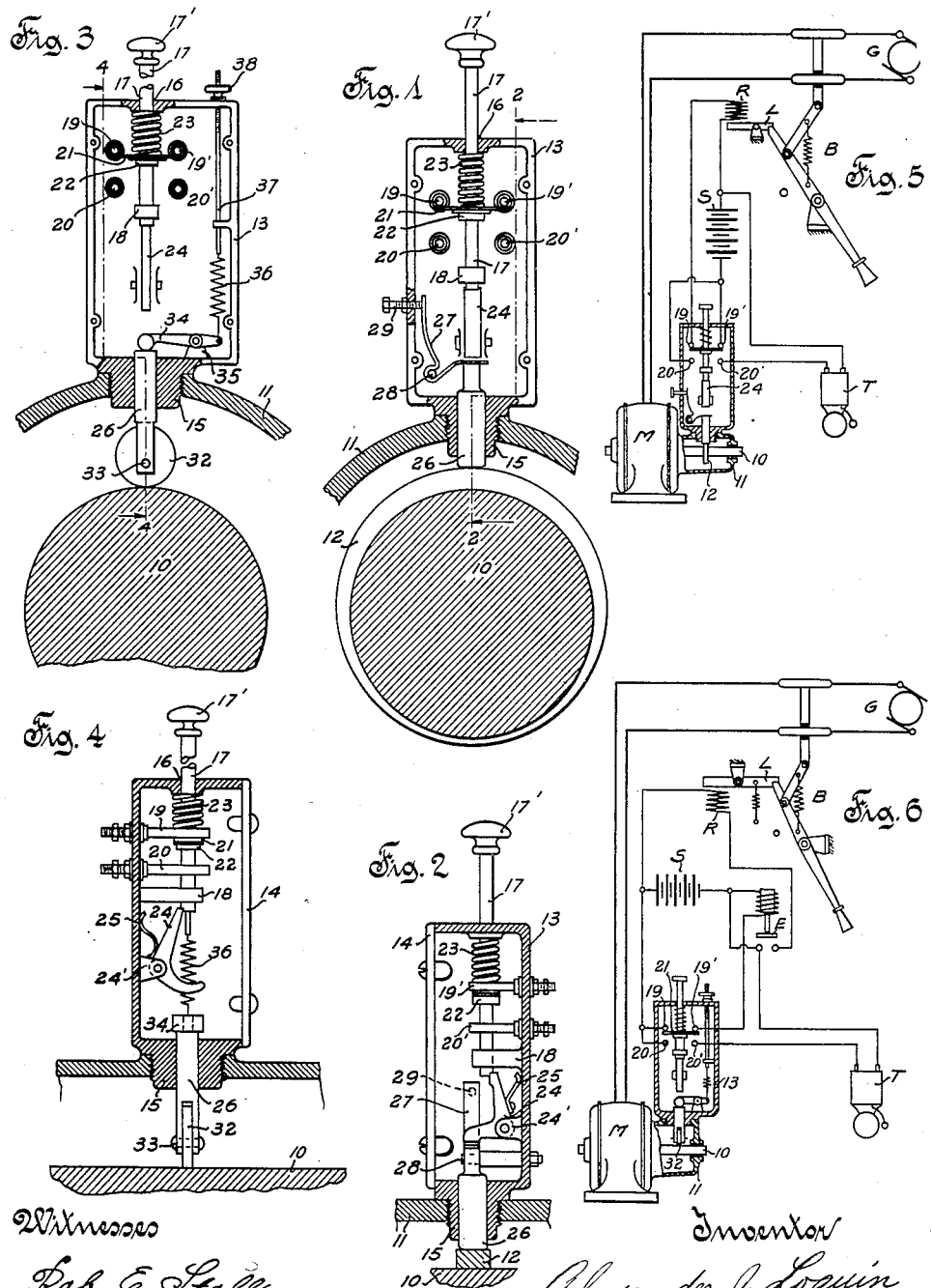

ALEXANDER J. LOGUIN, OF NORWOOD, OHIO, ASSIGNOR, BY MESNE ASSIGNMENTS, TO ALLIS-CHALMERS MANUFACTURING COMPANY, A CORPORATION OF DELAWARE.

SPEED-LIMITING DEVICE.

1,158,820. Specification of Letters Patent. Patented Nov. 2, 1915.

Application filed November 20, 1912. Serial No. 732,605.

*To all whom it may concern:*

Be it known that I, ALEXANDER J. LOGUIN, a subject of the Czar of Russia, residing at Norwood, in the county of Hamilton and State of Ohio, have invented a certain new and useful Improvement in Speed-Limiting Devices, of which the following is a specification.

The present invention relates to devices for limiting the speed of machines of various types, and particularly to devices of this class that are operated by a rotating shaft.

Machines of all types, whether direct connected to or driven through a mechanical connection from a prime mover, are very often subject to considerable fluctuation in speed. The speed may even become so high as to endanger the safety of either the transmitting mechanism or the machine itself.

The object of this invention is to provide means whereby, when the speed of the machine rises to a dangerously high value, it will be disconnected from the source of energy to prevent any damage to the machine parts; and to provide such a simple form of speed limiting device as may be applied to machines of various types.

It is a further object of this invention to provide a speed limiting device in which the inertia of a moving part, whose motion is transmitted from the operating shaft of the machine to which the device is attached, may be used to permit the movement of a member to its biased position to effect the operation of means which will reduce the speed or bring the machine to rest.

These and other objects are obtained in a speed limiting device embodying the features described in this specification and accompanying drawings, in which the invention is shown as applied to the bearing of the rotating shaft of a machine whose speed is to be limited; and there is disclosed one manner of utilizing the invention, in which the speed limiting device is applied to the shaft of an electric motor to effect the opening of the operating circuit of the motor when the speed rises to a dangerously high point.

In the drawings,—Figure 1 is a view in elevation of the operating parts of the speed limiting device, the parts being mounted in a casing whose cover is removed, and the device being shown as applied to a shaft bearing. Fig. 2 is a sectional view along the line 2—2 of Fig. 1 looking in the direction of the arrow. Fig. 3 is a view similar to Fig. 1, showing a modification of the speed limiting device illustrated in Fig. 1. Fig. 4 is a sectional view along the line 4—4 of Fig. 3 looking in the direction of the arrow. Fig. 5 is a diagrammatic view showing how the speed limiting device may be applied to the control of an electric motor, the casing of the speed limiting device and the bearing of the motor being shown in section and somewhat enlarged to show the operating parts, a device of the type illustrated in Fig. 1 being arranged to trip a latch of the circuit-breaker by means of a magnet having a normally closed holding coil. Fig. 6 is a diagrammatic view similar to Fig. 5, except that a device of the type illustrated in Fig. 3 is arranged to trip a latch of the circuit-breaker by a magnet having a normally open holding coil.

In Figs. 1 and 2 a shaft 10 is rotatably mounted in a bearing 11, and these elements may be parts of an electric motor or any other type of machine. Rigidly secured by welding or otherwise to the shaft 10, is an eccentric cam 12. A casing 13, having a removable side 14, is secured to the upper side of the bearing 11 by means of a threaded nipple 15. The casing has an opening 16 in the end opposite that bearing the nipple 15. A rod 17 is mounted to slide through the opening 16, and the portion of said rod extending beyond the casing is provided with a knob 17' to permit manual operation. A perforated guide 18 is secured to the inner side of the casing by casting or otherwise, and the lower end of the rod 17 operates in this guide. Extending through the back of the casing and insulated therefrom are one or more pairs of contacts 19, 19', and 20, 20', the contacts of each pair being on opposite sides of the rod 17. A resilient bridging member 21 is mounted on the rod 17 within the casing and is held between an abutment 22 rigidly secured to the rod and a spring 23 bearing against the upper side of the casing.

During the normal operation of the machine to which the speed limiting device is attached, the bridge 21 occupies its upper position in which it engages the contacts 19, 19', and is held in this position by a latch 24, urged to holding position by a spring 25 bearing against the inner side of the casing. With the bridge in this position, the spring 23 is under compression and tends to move the rod 17 to its lower position in which the bridging member 21 may engage contacts 20, 20'. The lower end of the rod 17 may be provided with a holding notch in which the end of the latch fits to insure a secure holding engagement between the rod and the latch 24.

Mounted to slide in the opening of the nipple 15, is a plunger 26, the lower end of which is in position to be engaged by the eccentric cam 12. The plunger is normally held in engagement with this cam by gravity, and further, by a spring 27 normally under tension, one end of which engages the upper end of said plunger. This spring is mounted on the stud 28 within the casing, and the pressure exerted on the end of the plunger may be adjusted by a set screw 29 passing through one side of the casing and engaging a portion of the spring.

In the operation of the device, the plunger 26 is reciprocated by the eccentric 12 as the shaft rotates, and for speeds below a certain predetermined amount, reciprocation of the plunger is in unison with the revolution of the shaft. For, when the shaft is rotating, a point, which may be defined as the intersection of the periphery of the eccentric with the center line of the plunger 26, is harmonically oscillated, the frequency of oscillation being expressed by the number of revolutions of the shaft. The plunger, representing a certain mass, is exactly following this oscillatory movement, when the resultant of its mass and the elasticity of the spring 27 are sufficient to hold the plunger against the periphery of the eccentric in all positions of the latter. When the point referred to above is moving upward, the plunger is being forced in the same direction by the eccentric, and when the point is moved downward, the plunger follows due to gravity and the elasticity of the spring. It is obvious that the adjustment of the spring 27 by the set screw 29 will provide different pressures on the end of the plunger, urging the same into engagement with the eccentric; and further, that the resiliency of the spring alone might be depended upon for normally holding the plunger against the eccentric, as when the casing of the speed limiting device illustrated was attached to the side of the bearing or even at the bottom of the bearing, where the spring would normally urge the plunger in an upward direction into engagement with the eccentric against the action of gravity. It is intended that the spring may be adjusted so that the oscillatory movements of the plunger and eccentric will be wholly in unison up to all practicable speeds.

Now, after the spring has been adjusted for a certain predetermined maximum speed, should it happen that the speed of the shaft is over this limit, the frequency of oscillation of the plunger will tend to be different from that of the point on the eccentric and the movement of the former will not be exactly the same as the point on the surface of the eccentric, but slower. When the point on the eccentric is in its lowest position, the plunger will not quite reach it and when the point starts upward the plunger, if the lag of the same behind the point on the eccentric is comparatively great, may still be going downward and this will cause impact which will throw the plunger upward with greater than normal velocity. In other words, the point on the eccentric will deliver a hammer blow to the lower end of the plunger which will ordinarily move the plunger beyond the normal upper limit of its oscillation. The dissonance of the oscillatory movements will result in a very irregular movement of the plunger, and more or less noise will be caused by the hammer blows delivered at a point on the eccentric; and finally, the plunger will be thrown so much higher than its normal upper limit of motion that the latch 24 will be tripped. For all velocities below normal, the unison of oscillation will not be impaired because the spring being adjusted for a higher velocity, will so much more surely return the plunger and hold it in engagement with all points on the periphery of the eccentric.

It is obvious that the mass of the plunger is a factor in determining the speed at which the oscillations of the plunger and eccentric will no longer be in unison. But the plunger having once been chosen and inserted in the device, further adjustment is made by the spring.

When the latch 24 is tripped, the rod 17 is forced to its lowest position by gravity and the spring 23. The movement of the rod 17 may be made use of in a variety of ways, although such movement is here shown as operating contacts in a tripping circuit of the motor cut-out, the bridge 21 leaving contacts 19, 19', to operate said tripping circuit.

In the modification illustrated in Figs. 3 and 4, the plunger 26 is reciprocated by an eccentric cam 32 pivotally mounted at 33 on the lower end of the plunger. This eccentric cam operates on the periphery of the shaft 10, rolling along the same to reciprocate the pivotal point 33. The eccentric is urged against the periphery of the shaft by the mass of the plunger and eccentric and the pivoted spring pressed lever 34. This lever is preferably pivoted to the casing 13 and one end thereof, of comparatively great mass, rests on the upper end of the plunger 26, the other end of the lever being drawn by the spring 36 in a direction to forcibly press the opposite end against the plunger. The other end of the spring is attached to a threaded rod 37 passing through the casing and adjustable by a thumb nut 38 to vary the tension of said spring.

As in the form shown in Figs. 1 and 2, movement of the plunger is normally constrained to a path the length of which is equal to the difference between the shortest and the longest radius of the eccentric, and the plunger moves in this path when its oscillation is in unison with the rotation of the shaft, that is, for speeds below a predetermined limit. At speeds higher than this limit, the plunger lags behind on its downward movement, and as the plunger descends with the cam rotating, the action between the shaft and the cam is such that a hammer blow of more or less intensity is delivered, causing the plunger in its upward movement to exceed the ordinary limit of travel. A point is finally reached where the lag of the plunger is so great that a sufficiently heavy blow is delivered to raise the plunger against the mass of the lever 34 and the tension of the spring 36 to trip the latch 24. The tripping of the latch permits movement of the rod 17 to its normally biased position and allows the operation in its movement of any device for decreasing the speed of or completely stopping the shaft.

In either of the forms of speed limiting device illustrated and described, the speed at which the device operates may be varied by changing the tension of the spring that exerts pressure on the end of the plunger. The form of invention shown in Figs. 3 and 4 is more desirable for lower speed values, and is highly advantageous in that there is no necessity of providing the shaft 10 with an eccentric. In other words, the device shown in Figs. 3 and 4 may be applied to any ordinary machine with no further trouble than boring a hole for the insertion of the securing nipple of the casing.

It can readily be seen that the motion of the actuator 17, transmitted from the compressed spring 23, may be used for actuating the admission valve of any fluid prime mover, for shifting a belt which drives a shaft, to the bearing of which the device is attached, for throwing out a clutch; or, in fact, for actuating a control member to operate any known means for reducing the speed or stopping the driven shaft.

In the form of invention illustrated and described, the actuator 17 is made to operate contacts for making or breaking the circuit of a tripping coil of a circuit-breaker in the motor circuit. An additional set of contacts are provided with which the bridging member 21 engages, after the device is tripped, to close an alarm circuit.

In Fig. 5 a generator G supplies energy to a motor M and a circuit-breaker B is inserted in the line between these elements. This circuit-breaker is biased to open position and is held in closed position by a latch L which is biased, as by gravity, to a position wherein it is free of the circuit breaker and which is held in operative position by the holding coil R, energized from the source S when the bridging member 21 is in engagement with the contacts 19, 19'. When the speed of the shaft 10 of the motor M rises beyond a predetermined limit, the bridging member 21 is moved to break the circuit of holding coil R, allowing the latch L to move by the action of gravity so as to trip the circuit-breaker B and open the circuit of the motor. The bridging member 21 engages contacts 20, 20', in its lower position, to close the circuit of a normally inoperative alarm T.

In Fig. 6 the latch L is normally held in operative position when the circuit of the coil R is open. When the speed of the motor M reaches a predetermined limit, the bridging member 21 is moved out of engagement with the contacts 19, 19', and this separation opens the circuit of the holding coil of the switch E, allowing the same to drop to complete the circuit of the coil R. Energization of the latter circuit trips the latch L and allows the circuit-breaker B to open the circuit of motor M. The bridging member 21, in its lower position, completes the circuit of a normally inoperative alarm T.

It should be understood that it is not desired to be limited to the exact details of construction shown and described, for obvious modifications will occur to a person skilled in the art.

It is claimed and desired to secure by Letters Patent,—

1. In a speed limiting device, a rotating member, a second movable member, means associated with one of said members and cooperative with the other member to cause the reciprocation of said second member, and guiding means for confining the movement of said second member to a straight line, the oscillation of the reciprocating member being in unison with the oscillation of the rotating member when the speed of the rotating member is below a predetermined value and falling behind that of the rotating member when the speed of rotation is greater than said predetermined value.

2. In a speed limiting device, a rotating member, a second member free to oscillate, one of said members bearing an eccentric cam surface engageable by the other member whereby the second member is oscillated, and means for pressing said members together and effective to overcome any tendency of the members to separate while the speed of the rotating member is below a predetermined value, said pressing means being adjustable at will to vary the speed value at which said members separate.

3. In a speed limiting device, a shaft, means for rotating the shaft, a member free to reciprocate, a cam connection between the shaft and said member for reciprocating the latter, the oscillation of the reciprocating member being in unison with the rotation of the shaft at speeds of rotation below a predetermined value, and a second member normally inoperative and operable by the reciprocating member when the speed of the shaft rises above the predetermined value.

4. The combination with a shaft and means for operating the same, of a member free to reciprocate, an eccentric on one of said parts engaging a portion of another part to reciprocate said member, and a member operable by the reciprocating member only when the speed of the shaft reaches a predetermined value.

5. In combination, a shaft, a member free to reciprocate bodily, and an operative connection between said member and said shaft for reciprocating said member bodily to a limited degree while the speed of said shaft is below a predetermined value, said member being reciprocable to a greater degree through said operative connection when the speed of said shaft reaches said predetermined value.

6. In combination, a rotating member and a member bodily reciprocable in response to rotation of said first member, said reciprocable member moving in unison with the rotating member at normal speeds of rotation of said rotating member, and in dissonance with said rotating member at higher speeds of rotation thereof.

7. In combination, a rotating shaft and means for rendering the same inoperative when the speed rises above a predetermined value, comprising a normally inoperative actuating member, a second member free to reciprocate, and a cam connection between said reciprocating member and said shaft, the movement of said reciprocating member being limited during the rotation of the shaft at normal speed and effective to operate said actuating member when the speed of the shaft rises above a predetermined value.

8. In a speed limiting device, a shaft, means for rotating said shaft, a member adjacent said shaft free to oscillate, an element biased to one position, a latch for holding said element in a second position, and eccentric means between said shaft and said member for causing the oscillation of said member, the movement of said member being constrained when the shaft is moving at speeds below a predetermined value and being free to permit said member to trip said latch when the speed of rotation of the shaft reaches said predetermined value.

9. In combination, a shaft, a bearing for said shaft, a member extending through the bearing and free to oscillate, an eccentric cam connection between the shaft and said member to oscillate said member, and a second member normally inactive, said oscillating member rendering said second member operative when the speed of said shaft reaches a predetermined value.

10. In combination, a shaft, an actuating member and a second member free to reciprocate, an eccentric connection between said shaft and said second member to reciprocate the latter with a movement which varies with the speed of rotation of the shaft, said second member being effective to operate said actuating member when the speed is above said predetermined value.

11. In combination, a shaft, an actuating member biased to operative position, a latch for holding said member inactive, a second member free to reciprocate, an eccentric connection between said shaft and said second member to reciprocate the latter with a movement which varies with the speed of rotation of said shaft, said second member being effective to trip said latch to allow said actuating member to operate when the speed of rotation of said shaft is above a predetermined value.

In testimony whereof, my signature is affixed hereto in the presence of two witnesses.

ALEXANDER J. LOGUIN.

Witnesses:
 Louis C. Nichols,
 John C. Davenport.